United States Patent [19]
Kurazono et al.

[11] Patent Number: 5,804,039
[45] Date of Patent: Sep. 8, 1998

[54] METHOD FOR REMOVING RESIDUAL MONOMERS

[75] Inventors: Toshinobu Kurazono, Minamata; Seiichi Uchida, Chiba; Seigo Ishibashi, Ichihara; Etsuro Matsuda, Minamata, all of Japan

[73] Assignee: Chisso Corporation, Osaka-fu, Japan

[21] Appl. No.: 690,143

[22] Filed: Jul. 31, 1996

[30] Foreign Application Priority Data

Aug. 4, 1995 [JP] Japan .................................. 7-200038

[51] Int. Cl.⁶ ........................................................ B01D 3/38
[52] U.S. Cl. ........................ 203/49; 159/4.04; 159/4.4; 159/16.3; 159/47.1; 159/DIG. 10; 203/92; 203/96; 203/DIG. 9; 528/500; 528/501
[58] Field of Search .................................. 203/49, 90, 92, 203/95–96, DIG. 9; 159/28.6, 16.3, 47.1, 4.4, DIG. 10, 48.1, 4.04; 528/500, 501

[56] References Cited

U.S. PATENT DOCUMENTS

| | | | |
|---|---|---|---|
| 4,017,355 | 4/1977 | Kiyota et al. | 159/DIG. 10 |
| 4,017,445 | 4/1977 | Wortmann et al. | 528/500 |
| 4,077,135 | 3/1978 | Tzschoppe et al. | 34/57 R |
| 4,147,859 | 4/1979 | Davis et al. | 528/496 |
| 4,158,092 | 6/1979 | Bötsch et al. | 528/500 |
| 4,184,924 | 1/1980 | Hornbaker et al. | 159/16.3 |
| 4,228,273 | 10/1980 | Hughes | 159/16.3 |
| 4,260,847 | 4/1981 | Kaiser et al. | 585/833 |
| 4,282,348 | 8/1981 | Wada et al. | 528/500 |
| 4,303,479 | 12/1981 | Church et al. | 203/92 |
| 4,408,040 | 10/1983 | Flock et al. | 528/500 |

Primary Examiner—Virginia Manoharan
Attorney, Agent, or Firm—Fay, Sharpe, Beall, Fagan, Minnich & McKee

[57] ABSTRACT

A method for removing residual vinyl chloride monomers from an aqueous slurry is disclosed. The method preferably utilizes a tower having a plurality of vertically spaced plates, which define a plurality of chambers, each chamber defined between adjacent plates. The tower features a plate in one of the chambers having a diameter of 1.05 to 5 times larger than the diameter of the plates in chambers above and below the chamber having the large plate. The method is based upon introducing the slurry to a particular location in the tower depending upon the porosity of the polyvinyl chloride in the slurry.

5 Claims, 3 Drawing Sheets

METHOD FOR REMOVING RESIDUAL MONOMERS

BACKGROUND OF THE INVENTION

1. Field of the Invention

The present invention relates to an apparatus for removing unreacted residual monomers primarily comprising vinyl chloride monomer (hereinafter referred to as VC) contained in a mixture of polyvinyl chloride (hereinafter referred to as PVC) and an aqueous medium (hereinafter referred to as PVC slurry), in the manufacture of vinyl chloride resins (hereinafter referred to as PVC). The present invention also relates to a method for removing the unreacted residual monomers using such an apparatus.

More particularly, the present invention relates to an apparatus for removing residual monomers having a wide range of capability of compliance such that one apparatus for removing the residual monomers can achieve a uniformly high deal efficiency to PVC slurries which are largely different in PVC characteristics or properties and in readiness of releasing monomers, and produce a high resin quality at an excellent operating performance. The present invention also relates to a method for removing the residual monomers using such an apparatus.

2. Description of the Related Art

PVC is a resin having excellent chemical and physical characteristics, and therefore, it is used in a wide variety of fields. Generally, PVC is manufactured by suspension polymerization, emulsion polymerization, or bulk polymerization. Among these methods, suspension polymerization and emulsion polymerization are commonly employed since they provide advantages such that heat of reaction can be easily removed, that the final product of PVC containing a reduced amount of impurities can be manufactured, and that PVC after polymerization is particulate and thus a granulating step is unnecessary. Suspension polymerization and emulsion polymerization are generally carried out by placing VC, an aqueous medium, a dispersant, a polymerization initiator, etc. in a reactor equipped with a stirrer, and polymerizing VC while keeping it at a predetermined temperature. It is a general practice that the polymerization reaction is not continued until the VC is converted to PVC by 100%, but the polymerization is terminated at a conversion from 80 to 95% which provides an optimum manufacturing efficiency. Therefore, the PVC slurry after termination of polymerization reaction contains a considerable amount of unreacted residual monomers.

Since these residual monomers are harmful to humans, care must be taken to prevent the residual monomers from migrating into PVC particles or transferring into waste water or air. Accordingly, residual monomers must be removed and recovered from the PVC slurry as much as possible.

According to conventional methods of removing residual monomers, an aqueous medium is mechanically separated from the PVC slurry obtained by polymerization, and then the aqueous medium and residual monomers which remain in PVC in small amounts are removed by hot air-drying, etc. to obtain PVC powder as an end product.

These methods cannot effectively remove residual monomers from waste water, and in addition, allow residual monomers to migrate into the gas exhausted from a dryer. Moreover, it sometimes occurs that residual monomers are not removed to a sufficient level from the end product, PVC powder. Thus, conventional methods are not satisfactory in terms of safety, hygiene, and preservation of the environment.

As a method to efficiently remove and recover unreacted residual monomers from a slurry after termination of the polymerization, Japanese Patent Application Laid-open (kokai) Nos. 54-8693 and 56-22305 have proposed a method which employs an apparatus including a hollow cylindrical tower which has a plurality of plates having a number of through perforations, disposed one on another with a space therebetween inside the tower, a port for jetting steam into the tower at the bottom of the tower, and a slurry introducing port and a gas discharging port at the top of the tower. In that apparatus, PVC slurry is treated as follows. First, the slurry is introduced from a sole PVC slurry introducing port provided at substantially the top of the hollow cylindrical apparatus. The PVC slurry flows along treating passages formed on the plates which have a number of through perforations, are substantially concentrically disposed, and have partition walls thereon so that a treating passage of many U-turns is formed. While the slurry flows through the passage, it is exposed to steam jet which comes up from the bottom through the perforations in the plates. Therefore, as the slurry flows down the plates one by one, residual monomers contained in the slurry are evaporated to separate. The PVC slurry thus treated is discharged from a sole PVC slurry discharging port which is provided substantially at the bottom section of the apparatus.

Presently, various kinds of improvements have been achieved on the quality of PVC as its application has been diversified. As a result, the problems at the time of removing residual monomers concerning the releasability of residual monomers which depends on the internal structure of PVC particles, degradation of PVC when exposed to heat, and bubbling properties of slurries in the apparatus for separating residual monomers are diversified. In particular, PVC which has been improved to have greater amounts of voids in its particles in order for an increased amount of plasticizing agent to be absorbed contains a large amount of residual monomers which are left in PVC particles after polymerization reaction. Therefore, if a PVC slurry including such PVC is treated with a conventional apparatus for removing residual monomers, the slurry is excessively bubbled with evaporated residual monomers when it contacts with steam, causing the following drawbacks:

1. PVC slurry flows over the partition walls and is discharged without passing through predetermined passages for treatment. Thus, a PVC slurry from which residual monomers have not sufficiently been removed migrates into a PVC slurry which has normally passed through the passage, contaminating the PVC end product with PVC particles containing residual monomers at a high concentration.
2. PVC particles blown up by the bubbles tend to adhere to the inner walls of the apparatus. The adhered particles deteriorate after being exposed to steam at a high temperature for a long time to produce colored particles, which migrate into the PVC end product, reducing its value.

These drawbacks may be overcome by introducing a reduced amount of PVC slurry in conventional methods so that the slurry will not flow over the partition walls. However, this approach results in a decrease in amounts of PVC treated per hour in the process of residual monomer treatment to eventually reduce the production of the PVC end product per hour.

In the case where the PVC readily releases residual monomers, the contact time of the PVC with steam may be shorter than that required for a PVC from which residual monomers are difficult to remove. However, if the apparatus for removing residual monomers is designed to meet conditions suitable for the treatment of slurries containing PVC from which residual monomers are difficult to remove, use of such an apparatus for treating a PVC slurry containing PVC which easily release residual monomers causes such an undesirable result that the PVC undergoes excessive heat degradation to deteriorate the quality of the PVC end product. This is because the PVC slurry contacts with steam for an unnecessarily prolonged period even after residual monomers was sufficiently removed. On the other hand, if the apparatus for removing residual monomers has been designed to meet conditions suitable for the treatment of slurries containing PVC from which residual monomers are easily removed, and if a slurry containing PVC from which residual monomers are difficult to remove is treated with such an apparatus, residual monomers cannot be completely removed, allowing the PVC slurry to pass through the residual monomer removing process while retaining residual monomers at a high concentration. Thus, conventional apparatuses for removing residual monomers cannot satisfy either the case where PVC slurries containing PVC from which residual monomers are easily removed are treated and the case where PVC slurries containing PVC from which residual monomers are difficult to be removed are treated.

SUMMARY OF THE INVENTION

As a result of diligent studies carried out by the present inventors to solve the above problem, an apparatus for removing residual monomers which is capable of smoothly complying with a wide variety of PVC slurries having different characteristics, and a method using such apparatus have been developed to achieve the present invention.

Specifically, as a result of the research conducted on the bubbling of a PVC slurry when residual monomers are removed therefrom, the following facts have been found. First, the bubbles generated from a PVC slurry when it is treated with steam on the plates are the ones generated from the residual monomers liberated from the inside of PVC particles and the aqueous medium. Second, the bubbling makes the PVC slurry flowing on the plates overflow beyond the partition walls dividing the passages for treatment. Third, a 5-minute contact of the slurry with steam removes not less than 70% of the residual monomers existing inside the PVC particles, from which it is presumed that the bubbling phenomenon takes place most vigorously on a plate serving as the floor of the chamber to which the PVC slurry is first introduced. From these facts, it has been found that when the diameter of the plate which serves as the floor of the chamber having at least one PVC slurry introducing port was increased so as to have a diameter greater than that of other plates, the height of the PVC slurry on the plate is substantially reduced, and thus, bubbles of a bubbling slurry are prevented from overflowing beyond the partition walls, and, according to this approach, the amount of the PVC slurry to be treated is not necessary to be reduced. In addition, in view of the fact that PVC slurries containing PVC from which residual monomers are more easily removed tend to more vigorously boil up, the following have been carried out. First, a PVC slurry introducing port is provided in at least two separate chambers of the tower. Then, when a PVC slurry which requires a prolonged time for evaporating and separating VC is treated, the slurry is introduced from a slurry introducing port provided in a chamber remote as much as possible from that having a slurry discharging port to secure the residence time. On the other hand, when a PVC slurry from which VC is evaporated and separated in a short time is treated, the residence time necessary and sufficient to evaporate and separating VC can be afforded by introducing the slurry from a slurry introducing port provided in a chamber relatively close to that having a slurry discharging port while avoiding the PVC slurry from contacting with steam for an excessively prolonged period not to cause an excessive heat degradation of PVC.

The term "porosity" as used hereinafter means a volume of microvoids in PVC (ml/g).

The invention claimed in the present application is summarized as follows:

a hollow cylindrical tower;

a plurality of plates provided one on another with a space therebetween in a vertical direction in the tower, each having many perforations;

a plurality of chambers each formed on one of the plates which serves as a floor of the chamber;

a slurry introducing port provided in at least two of the chambers;

a flow-down section provided between two adjacent plates to allow a slurry to sequentially flow down from a plate of a higher chamber to a plate of a lower chamber;

a steam introducing port provided at a bottom of the tower; and a slurry-discharging port provided in a chamber lower than the chamber having the slurry introducing port, wherein the plate in one of the chambers provided with the slurry introducing port has a diameter 1.05 to 5 times as large as that of the plates located in the chambers immediately above and below the plate of the chamber provided with the slurry introducing port, respectively.

In another aspect of the present invention, there is provided an apparatus described above, further comprising hot water jetting means located in the proximity of at least one of plates, with being faced to the lower face of the plate.

Preferably, the diameter of each perforation is from 0.5 to 5.0 mm.

Preferably, the proportion of an area of the perforations in each plate to an area of the plate is from 0.001 to 10%.

In a further aspect of the present invention, there is provided a method for removing residual monomers using the above apparatus, which method comprises the steps of:

introducing a polyvinyl chloride-containing slurry from the slurry introducing port;

blowing steam from a steam introducing port provided at a bottom of the tower;

allowing the slurry to contact with steam while the slurry flows downward through the plates;

thereby separating residual monomers from the slurry; and at the same time discharging a gas containing the separated residual monomers from the top of the tower, and discharging the slurry from which residual monomers were removed from the slurry-discharging port;

wherein the step of introducing the polyvinyl chloride-containing slurry is carried out in accordance with the following (1), (2), or (3):

(1) supplying the slurry from the slurry introducing port provided in a chamber above the chamber having a plate with a greater diameter, in the case where the residual monomers are difficult to remove from the slurry, (2) supplying the slurry from the slurry introducing port provided in the chamber having a plate with a greater diameter or from the slurry introducing port provided in a chamber lower than the chamber having a plate with a greater diameter, in the case where the residual monomers are easily removed from the slurry, (3) supplying the slurry from the slurry introducing port provided in the chamber having a plate with a greater diameter, in the case where the slurry has a high bubbling property.

Particularly, when the porosity of the polyvinyl chloride in the slurry is not less than 0.300 ml/g, the slurry is introduced to the chamber having a plate with a greater greater diameter or to a chamber located lower than that chamber.

Also, when the porosity of the polyvinyl chloride in the slurry is not less than 0.350 ml/g, the slurry is introduced to the chamber having a plate with a greater diameter, Also, when the porosity of the polyvinyl chloride in the slurry is less than 0.300 ml/g, the slurry is introduced to a chamber located above the chamber having a plate with a greater diameter.

DESCRIPTION OF PREFERRED EMBODIMENTS

The apparatus for removing residual monomers of the present invention can select optimal conditions according to respective PVCs to be treated so that when a PVC slurry from which residual monomers are difficult to remove is treated, the residence time is prolonged, and in contrast, when a PVC slurry from which residual monomers can be easily removed is treated, the residence time is reduced. Thus, there is substantially no need to change the amount of the PVC slurry to be treated depending on the readiness of releasing residual monomers. Therefore, residual monomers can be very efficiently removed with the apparatus of the invention.

Moreover, according to the present invention, it is possible to flexibly control the conditions for removing residual monomers for PVCs having a variety of characteristic and properties which were not complied with by a single conventional apparatus. For example, residual monomers can efficiently removed with one apparatus depending on bubbling properties of slurries, readiness of releasing monomers, and susceptivity of the PVC to heat degradation.

In this invention, the term PVC is used to refer to homopolymers of VC, copolymers of VC and a monomer which is polymerizable with VC, polymers obtained by graft polymerization of VC to an olefin polymer, and polymers which are composed of two or more of these polymers. In order to efficiently remove residual monomers according to the present invention, polymers preferably contain 50% by weight or more of VC as a structural unit of the polymer. Such polymers may be obtained either by suspension polymerization or emulsion polymerization.

Specific examples of the polymerizable monomers which are polymerizable with VC include carboxylic esters of a vinyl alcohol, such as vinyl acetate; vinyl ethers such as alkylvinyl ethers; unsaturated carboxylic esters such as acrylates and methacrylates; vinylidene halides such as vinylidene chloride and vinylidene fluoride; unsaturated nitriles such as acrylonitrile; and olefins such as ethylene and propylene.

In the present invention, the term PVC slurry is used to refer to a slurry containing PVC and an aqueous medium. A PVC slurry after termination of polymerization reaction contains unreacted residual monomers in addition to PVC and an aqueous medium. In the manufacture of PVC, a dispersant such as polyvinyl alcohol and hydroxypropyl methylcellulose, and if desired, a buffer, particle size regulator for PVC, agent for suppressing scale adhesion, defoamer, etc. are used. PVC slurries may therefore contain a necessary amounts of these additives.

It is preferred that the concentration of the PVC contained in a PVC slurry (hereinafter referred to as the slurry concentration) which is treated by the method of the present invention be from 5 to 45% by weight, and more preferably from 10 to 40% by weight. If the slurry concentration is too high, the fluidity of the PVC slurry in the apparatus for removing residual monomers becomes poor. On the other hand, if the slurry concentration is too low, substantial amount of the PVC which is treated significantly decreases.

Generally speaking, the PVC slurry which is subjected to the treatment of the present invention may be one that is transferred to a PVC slurry tank after the polymerization reaction has been terminated, and after or before the inside pressure of the reactor has dropped to atmospheric pressure. Alternatively, a PVC slurry for which polymerization reaction is terminated when conversion has reached an arbitrary point in the course of polymerization may also be used after being transferred to a PVC slurry tank. The PVC slurry is supplied from the slurry tank to the apparatus for removing residual monomers of the present invention using a transferring means such as a pump at a predetermined flow rate.

The method for removing residual monomers from a PVC slurry using the apparatus of the present invention will be described with reference to FIGS. 1 to 3. However, the present invention is not limited to the specific embodiments described herein.

Figure 1:
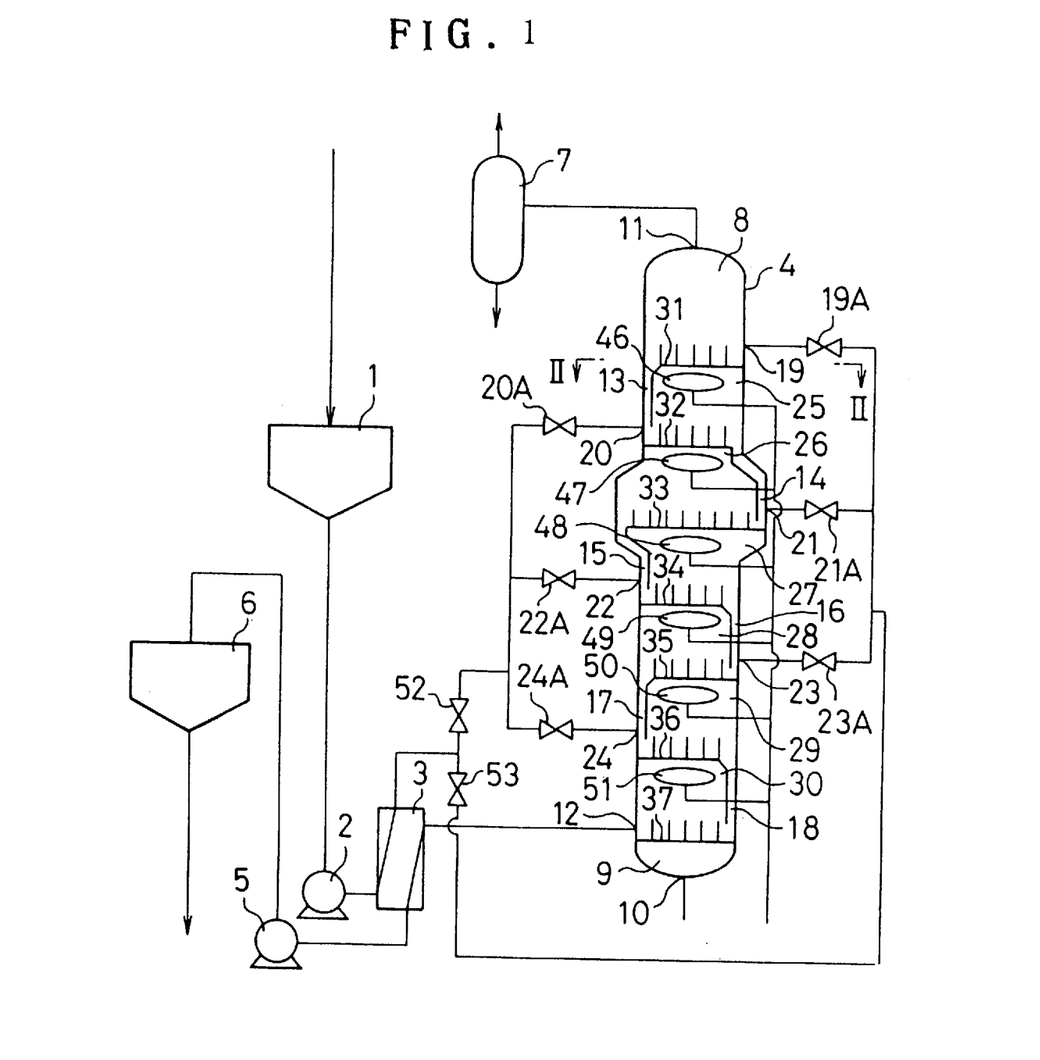
FIG. 1 is a schematic drawing showing a method for removing residual monomers using the apparatus for removing residual monomers according to the present invention.

FIG. 1 is a schematic drawing of an apparatus for removing residual monomers according to an embodiment of the present invention. This apparatus includes a hollow cylindrical tower 4, a plurality of plates 31 to 37 which are disposed in the vertical direction in the tower 4, each having many perforations, a plurality of chambers 8 and 25 to 30 each formed on one of the plates 31 to 37 which serves as a floor of the chamber, slurry introducing ports 19 to 24 provided in at least two of the chambers, flow-down sections 13 to 18 provided between two adjacent plates to allow a slurry to sequentially flow down from a plate of a higher chamber to a plate of a lower chamber, a steam introducing port 10 provided at a bottom of the tower 4, a slurry discharging port 12 provided in a chamber lower than the chamber 29 having the slurry introducing port, and hot water jetting means 46 to 51 each provided immediately below the plates 31 to 36. The plate of chamber 26, one of the chambers provided with a slurry introducing port, has a diameter 1.05 to 5 times as large as that of the plates located in chambers 25 and 27 located immediately above and below chamber 26. In the top chamber 8 of the tower 4 is provided a deaerating port 11 which is connected to a condenser 7. Each of the plates 31 to 37 has a number of perforations 43 as shown in FIG. 2. On each plate, partition walls 38 to 42 are provided so that the slurry flowed down forms a passage of many U-turns (or a zig-zag passage)

which is defined by the partition walls and inside wall of the tower. Numeral 45 indicates a division plate. The slurry introducing ports 19 to 24 are connected to a slurry supply line having valves 19A to 24A. The slurry supply line is also connected to a slurry tank 1 via valves 52, 53, a heat exchanger 3, and a pump 2.

The apparatus of the present invention can be manufactured with ease by assembling plate chambers (compartments) as unit each having plates 31 to 37. Alternatively, if a conventional apparatus is retrofitted, the apparatus can be manufactured by replacing a plate of the conventional apparatus with a plate 33 having a larger diameter which was fabricated separately in advance.

In the apparatus shown in FIG. 1, the PVC slurry which was obtained by suspension polymerization or emulsion polymerization and temporarily stored in a PVC slurry tank 1 is introduced to a heat exchanger 3 by a pump 2. The slurry is heated to a predetermined temperature in the heat exchanger 3 and is thereafter introduced into the apparatus through any one of the PVC slurry introducing ports 19 to 24.

Figure 2:
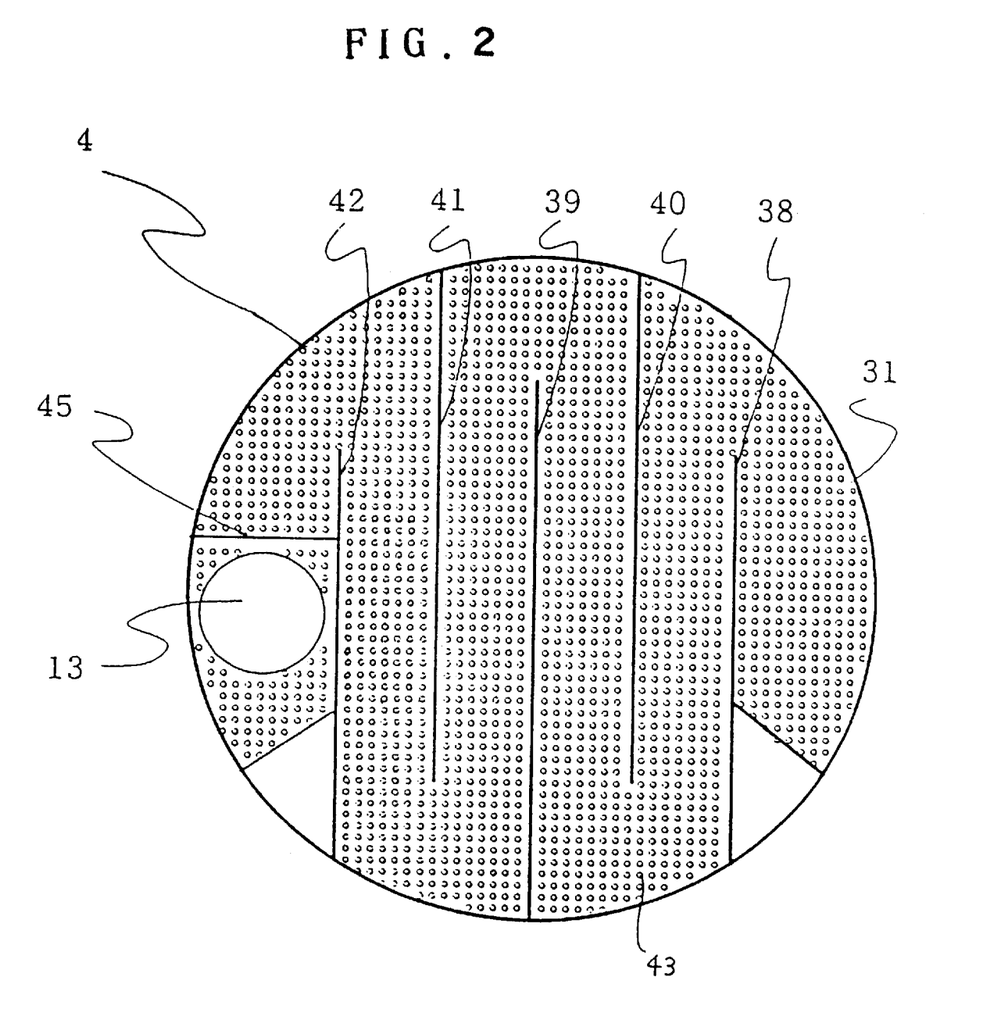
FIG. 2 is a schematic plan view of a perforated plate.

The flow rate of the PVC slurry which is introduced into the inside of the tower body 4 of the apparatus for removing residual monomers is from 0.1 to 300 m$^3$/h, and preferably from 1 to 100 m$^3$/h, per m$^2$ of the area of the plate 31 shown in FIG. 2. The flow rate is preferably adjusted by the amount of liquid forwarded by the pump 2.

The PVC slurry to be introduced into the tower 4 is preferably pre-heated at 50°–100° C. with the heat-exchanger 3. When the slurry is pre-heated, the efficiency of removal of residual monomers is enhanced.

The inner diameter of the plates provided in the tower 4 is from 200 to 10,000 mm with the plate having a smallest inner diameter, and 1.05 to 5 times, preferably 1.2 to 5 times as large as that of the plate having the smallest diameter with the plate having a largest inner plate.

The inner peripheral shape and size of the chambers each having a plate as a floor therefor may be the same or different from each other in any cross-section parallel to the plate.

The height of the tower 4 is from 2 to 20 times, and more preferably from 5 to 15 times as large as the diameter of the plate having the smallest diameter.

The apparatus for removing residual monomers according to the present invention has a slurry introducing port in at least 2 chambers. Moreover, the diameter of the plate which serves as a floor for a chamber having a slurry introducing port is generally from 1.05 to 5 times, and preferably 1.2 to 5 times as large as the diameter of the plates provided in the chambers immediately above and below the plate of the chamber having the slurry introducing port, respectively.

The readiness of a PVC slurry to release monomers depends on the structure of PVC particles in the PVC slurry. When PVC particles have a large porosity, contact between the PVC particle and steam is good. Accordingly, residual monomers tend to be easily removed. In addition, a slurry, after polymerization, containing such PVC particles tends to bubble. On the other hand, PVC having a small porosity does not readily release residual monomers. Thus, in the present invention, when polyvinyl chloride particles in a slurry have a porosity of not less than 0.300 ml/g, the slurry is preferably introduced into a chamber having a plate with a larger diameter or into a chamber located lower than that chamber. When polyvinyl chloride particles in a slurry have a porosity of not less than 0.350 ml/g, the slurry is preferably introduced into a chamber having a plate with a larger diameter. Moreover, when polyvinyl chloride particles in a slurry have a porosity of less than 0.300 ml/g, the slurry is preferably introduced into a chamber located upper than a chamber having a plate with a larger diameter.

In an apparatus for removing residual monomers, the number of plates is a decisive factor for determining the time in which a PVC slurry stays in the apparatus, i.e., the contact period of the PVC slurry with steam. In the apparatus of the present invention, the number of plates is determined so that the PVC slurry which requires the longest time for releasing residual monomers among a plurality of PVC slurries to be treated has a residence time at least necessary to cause a complete removal of residual monomers from the slurry can be secured. The introducing port from which the PVC slurry is actually introduced may be selected depending on the readiness of the slurry to release monomers and the residence time required.

The residence time in the apparatus can be determined based on the readiness of the slurry to release monomers as well as the concentration of the residual monomers in the PVC slurry to be introduced and the preset concentration of residual monomers contained in a discharged PVC slurry, etc.

A method for controlling the residence time in accordance with the readiness of the slurry to release monomers will be described with reference to FIG. 1. When a PVC slurry which does not readily release residual monomers is treated, for instance, the PVC slurry is introduced from the slurry introducing port 19. Introduced PVC slurry passes through a treatment passage formed by plate 31, partition walls 38 to 42 on the plate 31, and the inner wall of the tower to a flow-down section 13, and then introduced onto a plate 32 in the lower neighboring chamber.

The slurry thus introduced onto the plate 32 successively passes through a treatment passage on the plate 32 and flows down onto the plate in a chamber below. Thus, the slurry passes through the treatment passages on plates 31 to 37, and is finally discharged to outside the apparatus through the PVC slurry discharging port 12. On the other hand, when a PVC slurry from which residual monomers are easily removed is treated, for instance, the PVC slurry is introduced from the PVC introducing port 23 onto a plate 35.

The slurry is allowed to pass through the treatment passages on plates 36 and 37 in turn and treated. Moreover, when a PVC slurry which bubbles vigorously is treated, for instance, the PVC slurry is introduced from the PVC introducing port 21 which is arranged in the chamber 26 provided with a plate having a diameter greater than that of the plates 32 and 34 provided in the chambers immediately above and below the chamber 26, respectively, on the plate 33, and treated in the same way as mentioned above. Thus, by selecting the position of the plate on which a PVC slurry is introduced, according to the characteristics of the PVC slurry to be treated, the contact time of the PVC slurry with steam can be controlled to a time necessary and sufficient for removing residual monomers, and heat degradation of PVC due to excessive contact with steam can be avoided. When a PVC slurry which easily bubbles is treated, it is preferred that the slurry be introduced from the PVC introducing port 21 which is arranged in chamber 26 provided, as its floor, with plate 33 having a diameter 1.05 to 5 times, and preferably 1.2 to 5 times as large as that of the plate having the smallest diameter. If the diameter of a plate is great, the depth of the PVC slurry flowing through the passage on the plate becomes shallow. Therefore, the residence time of the steam which passes through the PVC slurry on the plate decreases, and bubbling of the slurry on that plate can be suppressed. As a result, the PVC slurry is prevented from overflowing beyond partition walls, and migration of a PVC slurry from which residual monomers is not sufficiently removed into a PVC product can be avoided. In addition, stabilized removal of residual monomers and operation of the apparatus becomes possible. If the diameter of the plate is less than 1.05 times as large as that of the plate having the smallest diameter, effect on suppression of bubbling is limited. On the other hand, if the diameter of the plate is greater than 5 times as large as that of the plate having the smallest diameter, the amount of the steam per unit area blown to the plate chamber through perforations is too small and results in insufficient stirring of the PVC slurry. This will cause precipitation of PVC particles, which sometimes makes operation of the apparatus difficult. In addition, construction costs of the apparatus will increase.

The readiness of the PVC slurry to release residual monomers depends on the porosity of the PVC in the slurry. Therefore, the port for introducing the slurry can be selected based on the determined value of the porosity of the PVC. That is, in the case where the porosity is not less than 0.300 ml/g, the slurry is introduced from the slurry introducing port located in chamber 26 (which is provided with a plate having a greater diameter) or any one of the chambers 28, 29, and 30 which are located below the chamber 26. In the case where the porosity is not less than 0.350 ml/g or the slurry tends to bubble, the slurry is introduced into the chamber 26 (which is provided with a plate having a greater diameter). Moreover, in the case where the porosity is less than 0.300 ml/g, the slurry is introduced into the chamber 25 which is located above the chamber 26.

Although only one slurry discharging port 12 is provided in the apparatus shown in FIG. 1, a plurality of slurry discharging ports may be provided in any chambers below the port from which the slurry is introduced. If a plurality of slurry discharging ports are provided, it is possible to select the port(s) from which the slurry is discharged. Thus, the chamber in which the plate having a greater diameter is located in the apparatus for removing residual monomers is no specifically limited. This is because the residence time can be controlled by selecting the discharging port.

When a demonomer treatment is performed, if the temperature of the PVC slurry is high, the efficiency of removing residual monomers enhances. However, if the temperature is too high, coloring or heat degradation of PVC particles are caused to deteriorate quality. Accordingly, the temperature of the PVC slurry must be adjusted properly. The temperature of the slurry flowing on plates is generally from 50° to 150° C., preferably from 70° to 120° C. and more preferably from 80° to 110° C. The temperature of the PVC slurry on plates can be controlled by the temperature and amounts of the steam which is jetted from below.

The pressure inside the tower 4 is preferably maintained in the range from 0.2 to 3 kg/cm$^2$ (abs).

If the balance of the temperature and pressure in the apparatus for removing residual monomers is lost due to disturbance, the flow of the PVC slurry on the plates tends to pulse. As its cause, it can be mentioned that the amount of heat exchanged by the heat exchanger is varied primarily by the fluctuation of the amount of the PVC slurry discharged from a PVC slurry discharging port, and thus the temperature of the PVC slurry introduced from the PVC slurry introducing port is varied. In such a case, if all the plates have the same size, the pulsating motion generated is transmitted down to a lower plate, which results in an unstable operation. In contrast, with the apparatus for removing residual monomers according to the present invention, when the PVC slurry is introduced to the plate having a diameter greater than that of other plates, a removal treatment of residual monomers begins to proceed under mild conditions with a smaller amount of steam jet compared to other plates. Thus, a pulsating motion which has already been started is mitigated on that plate with a greater diameter to cut off transmission of the pulsating motion onto lower plates. Moreover, with the apparatus for removing residual monomers according to the present invention, the flow of the PVC slurry is very stable. Therefore, even the amount of the PVC slurry which is discharged is also stabilized. Thus, the apparatus of the present invention has a remarkable effect in solving or singinifactly reducing the cause of the pulsating itself.

In a treatment for removing residual monomers, bubbling of slurry is not necessarily suppressed at all during the treatment even in a PVC slurry which does not readily release residual monomers, or in other words, which needs a number of plates for flowing the slurry thereon.

Especially when the balance of temperature and pressure was lost in the apparatus for removing residual monomers, bubbling sometimes causes the operation of the apparatus to become unstable. If all the plates have the same size, bubbling continues to no small number of lower plates, and PVC particles lifted up by bubbles or foams tend to adhere onto the walls of the chambers. Therefore, even when a water jet was applied to remove the adhered PVC from the walls, the separated PVC sometimes migrates as colored particles into the PVC discharged from the apparatus for removing residual. With the apparatus for removing residual monomers according to the present invention, any bubbling regardless of its degree can be efficiently mitigated at the plate having a greater diameter. Thus, when a PVC slurry which does not boil up significantly and which is generally difficult to release residual monomers is treated with the apparatus of the present invention, bubbling is substantially killed in the course of passing the plates. As a result, colored PVC is scarcely detected in the PVC discharged from the apparatus.

The apparatus for removing residual monomers according to the present invention, based on its specific structure and shape as described above, produces excellent effects of stilling the pulse of a PVC slurry to make a stable operation possible at a very high level and controlling the number of colored PVC particles contained in the PVC, which has undergone the treatment, at a high and stable level, which effects could never be obtained with conventional apparatuses.

In order to treat a slurry which does not bubble at all or bubble only slightly, the plate to which the slurry is introduced preferably has a smaller diameter. If the diameter is reduced, the amount of steam jetted per unit area of the plate is increased. In addition, the slurry depth on the plate becomes deep. As a result, the contact time of the PVC slurry with steam on the plate can be sufficiently secured to enhance the efficiency of removing residual monomers. Since the concentration of residual monomers in a PVC slurry decreases as the slurry flows down through the flow-down section in the apparatus, bubbling occurs less vigorously on lower plates than upper plates even though the slurry depth on lower plates become deep.

Referring to FIG. 1, a PVC slurry with a high bubbling property is introduced into the apparatus through a slurry introducing port 21. The PVC slurry thus introduced flows through the treatment passage formed with partition walls on plate 33 which has a number of through perforations. The slurry flows down the flow-down section 15 onto the lower plate. In this case, although the amount of the slurry introduced onto plate 33 is the same as other plates, the amount of slurry which is introduced into the apparatus per unit area of the plate 33 can be decreased since the diameter of the plate 33 is large. As a result, even with PVC slurries which bubble vigorously, demonomer treatment can be efficiently performed while suppressing bubbling.

In the present specification, the plates provided in an apparatus for removing residual monomers and each having a number of through perforations therein and a plurality of vertical partition walls on one surface thereof are called "plate structures".

The perforations in the plates are provided for that the PVC slurry is subjected to a treatment for removing residual monomers by the steam jetted through the perforations when the slurry flows on the plates. The size of each perforation, steam pressure, and the amount of the steam introduced must be set so that the PVC slurry is not be allowed to flow down through the perforations, the perforations are not blocked, and the steam jetted from below passes continuously and uniformly through the perforations.

The diameter of each perforation provided in the plates is not more than 5 mm, preferably from 0.5 to 2 mm, and more preferably from 0.7 to 1.5 mm. The opening ratio of each plate (total area of perforations/area of plate) is from 0.001 to 10%, preferably from 0.04 to 4%, and more preferably from 0.2 to 2%. If the opening ratio is too small, PVC particles in a PVC slurry flowing on the plates are not sufficiently stirred by the steam jetted through the perforations, causing the PVC particles to precipitate to reduce the efficiency of removing residual monomers. Moreover, the fluidity of the PVC slurry also decreases. On the other hand, if the opening ratio is too large, a phemenon that the PVC slurry drips from the perforations (this phenomenon is hereinafter referred to as the slurry leaking) occurs, or a large amount of steam is wasted in order to prevent the slurry leaking from the perforations.

The partition walls are provided for securing a treatment passages through which a PVC slurry can flow on the plates. Because of the presence of the partition walls, the PVC slurry can flow on each plate for a certain period of time, during which the slurry is treated with steam to remove residual monomers therefrom. The plate structure shown in FIGS. 2 and 3 has partition walls 38 to 42 arranged in an alternate relationship on plate 31.

The residence time of a PVC slurry in an apparatus for removing residual monomers is the time during which the PVC slurry passes through the passages for treatment formed on a predetermined number of plates. Accordingly, if the PVC slurry is desired to be introduced in an increased amount when each plate has a fixed diameter, it is sufficient to increase the height of the division plate 45 which divides each treatment passage from an entrance to each flow-down section in the apparatus. By controlling the height of division plates, the liquid depth of the PVC slurry on that plate can be adjusted. The treatment passages are defined by the manner of installation of the partition walls. The pattern of the passages is preferably the type of hair-pin curve as shown in FIG. 2. Other types of selectable examples include spiral, wheel, and star (radial).

There are no specific limitations on the plate structure of the present invention in the aspect of the number of partition walls and the width of the passages. However, if the number of partition walls is excessively increased and the height of the passages is made too high, the liquid depth of the PVC slurry becomes too deep, allowing unpreferable flooding of the slurry over the partition walls.

The apparatus of the present invention has a steam introducing port 10 in the bottom chamber 9 of the tower. The steam which is introduced from the port 10 is blown through perforations in plates 37 to 31 onto the PVC which flows on each of those plates. The amount of the steam introduced is preferably from 1 to 100 kg/h, and more preferably from 5 to 50 kg/h per 1 $m^3$ of PVC slurry. If the amount is too small, PVC particles in the PVC slurry precipitates, and thus, residual monomers in the PVC slurry cannot be removed efficiently. On the other hand, if the amount of the steam introduced is too large, the PVC slurry violently splashes, making stable treatment for removing residual monomers difficult. In addition, the efficiency of removing residual monomers from a PVC slurry is not improved compared with a large amount of steam introduced, leading to a very poor treatment efficiency.

The apparatus of the present invention preferably has at least one hot water jetting device at a position just under a plate. The hot water jetting devices 46 to 51 are fabricated by processing a pipe having a number of nozzle holes to a predetermined shape to form jet nozzles. The jet nozzles are preferably disposed such that the hot water is jetted to a direction crossing the vertical line at an angle of 10° to 60°. In the apparatus in FIG. 1, the hot water jetting devices 46 to 51 are placed right beneath the plates 31 to 36, respectively. Hot water is jetted from each device at predetermined time intervals to wash the lower surface of the plate and the inside wall of the tower.

The shape of the pipe which constitutes the hot water jetting devices 46 to 51 is generally like Greek letter omega ($\Omega$) or phi ($\Phi$), spirals, stars, or hair-pins. The shape like multiple layered rings in which rings are layered so that every other rings are cocentrically disposed may also be used. Each of the hot water jetting devices 46 to 51 is arranged in parallel to and directly below each plate. However, if the outermost parts of the hot water jetting devices 46 to 51 come too close to the inner circumferential walls of the tower, PVC particles and other materials which have been washed off may block clearances. Therefore, it is preferable that the hot water jetting devices be placed so that the outermost parts of each device is 20 mm or more apart from the surface of the inner walls of the tower.

The shape of the jet nozzle holes provided in the hot water jetting devices 46 to 51 may be circular, oval, slit-like, etc. The shape is selected depending on the purpose of use. If a circular or oval shape is employed, the diameter or the major axis is generally selected in a range from 1 to 8 mm, whereas if a slit-like shape is employed, the maximum length of the slit is generally in a range from 1 to 8 mm.

The PVC slurry from which residual monomers was sufficiently removed in the apparatus for removing residual monomers is introduced into a heat exchanger 3 by a pump 5. The slurry is cooled down in the heat exchanger 3 and then temporarily stored in a PVC slurry tank 6. Subsequently, the slurry is dewatered and is then supplied to a drying apparatus (not illustrated). The method of supplying the PVC slurry which has undergone a treatment for removing residual monomers and subsequent process steps are not particularly limited.

The monomer gas which was separated in the apparatus for removing residual monomers can be condensed in a condenser 7 after the gas has passed through the deaerating port 11. If the condensed water contains a great amount of vinyl chloride monomers, the condensed water may be treated again by returning it to the apparatus for removing residual monomers.

EXAMPLES

The present invention will next be described below with reference to Examples and Comparative Examples, which should not be construed as limiting the invention. In the following Examples and Comparative Examples, evaluation was made as follows.

(1) Concentration of residual monomers

A PVC slurry was sampled immediately after it was discharged from the slurry discharging port, and dewatered. Using a Gas Chromatograph 9A (tradename) manufactured by Shimadzu Corporation, the concentration of residual vinyl chloride monomers in PVC particles was determined based on a "head space" method. The determination was performed in accordance with ASTM D4443. The detection section employed a FID.

Generally, the concentration of residual vinyl chloride monomers in end PVC products is controlled so as not to become in excess of 1 ppm. After the slurry was discharged from the removal apparatus, small amounts of residual monomers can further be removed through the subsequent steps such as a drying step. It is preferred that the concentration of residual vinyl chloride monomers be controlled to be not more than 10 ppm at the stage where the PVC was discharged from the apparatus for removing residual monomers.

(2) Method for determining the yellowing factor (heat degradation factor)

PVC slurries before and after a treatment for removing residual monomers were dewatered, respectively. They were dried at 40° C. for 24 hours. Subsequently, PVC plates having the following composition were prepared under the below-described rolling conditions. The yellowing factor of the PVC plates were measured in accordance with JIS K7105. The greater the value, the more significant the yellowing (heat degradation) factor.

| Composition | |
|---|---|
| PVC | 100 parts |
| Tri-basic lead sulfate | 3 |
| Di-basic lead sulfate | 1 |
| Calcium stearate | 1 |
| Stearic acid | 0.5 |
| Rolling conditions: | |
| Roll type | 8 inch rolls |
| Roll temperature | 170° C. |
| Rolling time | 15 min. |
| Thickness of rolled sheet | 0.32 mm |

It is generally well known that the PVC with a low polymerization degree has undergone more severe heat degradation than the PVC with a high polymerization degree during polymerization since the former PVC has been prepared at a relatively high polymerization temperature compared to the latter PVC and that the former PVC contains many unstable structures from which heat degradation starts. It is also noted that PVC with a lower polymerization degree has a smaller porosity, and therefore residual monomers are difficult to separate from such a PVC. Therefore, a PVC with a low polymerization degree must requires a longer contact time of slurry with steam at the time for removing residual monomers compared to the contact time required by a PVC with a high polymerization degree. Because of this reason, PVCs with a low polymerization degree generally have a yellowing factor greater than that of PVCs with a high polymerization degree. In the process of removing residual monomers, if the yellowing factor of a PVC with a polymerization degree of 1300 can be suppressed not more than 5 and that of a PVC with a polymerization degree of 700 can be suppressed not more than 10, the quality of the final products will not depreciate its commercial values.

(3) Number of colored PVC particles

A part of the PVC slurry discharged from the PVC slurry discharging port 12 was sampled. The sample was dried to obtain 100 g of a PVC resin, which was spread on a white kent paper. While mixing the whole sample resin with a spatula, the colored PVC particles were visually identified and picked up. The number of the colored PVC particles was counted.

(4) Bubbling conditions on plates

On the two plates identified by A and B below, bubbling conditions were observed and evaluated based on the following criteria.

Plate A: The plate which serves as a floor of the chamber having a slurry introducing port through which a slurry is introduced into the apparatus from outside.

Plate B: The third plate below the plate A mentioned above (plate A is not counted).

Evaluation

A: Only slight bubbling or no bubbling is observed. The fluidity of the PVC slurry is excellent.

B: Low bubbling. The fluidity of the PVC slurry is good.

C: High bubbling, but the PVC slurry does not overflow beyond the partition walls.

D: Bubbles sometimes overflow beyond the partition walls.

(5) Porosity of PVC

Method of measurement: Mercury penetration method

Device: Porosimeter Model-70 (manufactured by Carlo-elba)

Pressure: Max 2,000 kg/cm$^2$

Six measurements were averaged.

Example 1

(1) Apparatus used for removing residual monomers

Figure 3:
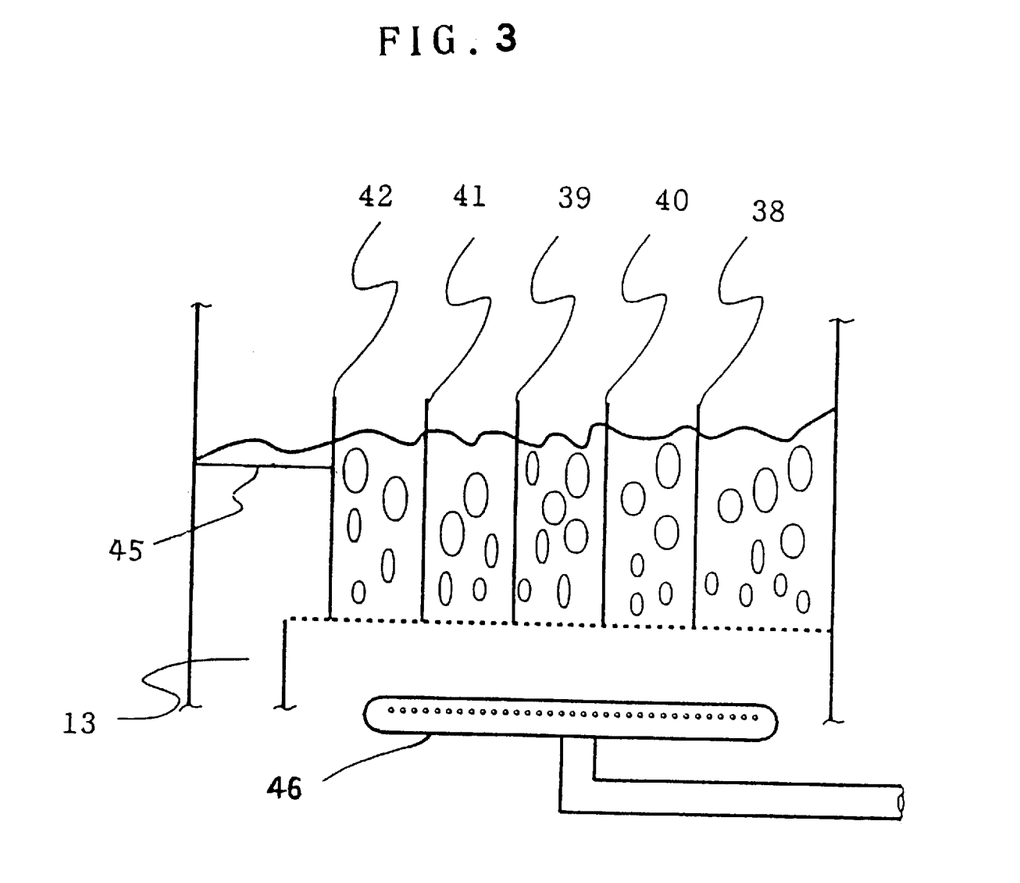
FIG. 3 is a schematic vertical view of a perforated plate.

The apparatus for removing residual monomers used in Example 1 had the structure as shown in FIGS. 1 to 3. More detailed particulars were as follows:

A) Number of plates: 7

B) Space between adjacent two plates: 1,400 mm

C) Specification of plate structure:

a) Plate structures No. 1, 2, 3, 4, 6, and 7 counted from the bottom:
Diameter of plates: 1,300 mm
Diameter of each perforation: 1.3 mm
Opening ratio (%): 0.3% (total area of perforations/ area of plate)
Height of partition walls: 500 mm
Height of division walls: 450 mm
Width of the passages for treatment: 200 mm b) Plate structure No. 5 counted from the bottom:
Diameter of plate: 2,000 mm
Diameter of each perforation: 1.3 mm
Opening ratio (%): 0.3% (total area of perforations/ area of plate)
Height of partition walls: 290 mm Height of division wall: 250 mm
Width of the passage for treatment: 200 mm
D) PVC slurry introducing port:
  Location: Chambers No. 3, 4, 5, 6, 7, and 8 counted from the bottom.
  Number: One for each chamber, a total of 6 ports.
E) PVC slurry discharging port:
  Location: Chamber No. 2 counted from the bottom.
  Number: One.
F) Hot water jetting device:
  Location: At the position 15 cm below the lower surface of each of plate Nos. 2, 3, 4, 5, 6, and 7 counted from the bottom.
  Number: One at each location, a total of 6 devices.
  Diameter: 800 mm
Jet nozzle: Circular nozzles each having a diameter of 4 mm. Some nozzles were inclined 4° from a vertical direction, and the other ones were inclined 30° from a vertical direction.
  Each of them was arranged to wash the inside walls of the chamber and the lower surface of the immadiate upper plate.
  Shape: A ring shape, made of a pipe having a diameter of 50A.
  Manner of jetting: Hot water was jetted in an amount of 0.5 m³/h for 5 seconds at intervals of 10 minutes.
(2) Used PVC slurry:
  PVC: A homopolymer having an average polymerization degree of 1,300.
  Slurry concentration: 30% by weight
  Concentration of residual vinyl chloride monomers: 30,000 ppm
  Porosity of PVC: 0.322 ml/g
(3) Steam introduced from the steam introducing port 10:
  Temperature: 110° C.
  Flow rate: 600 kg/h
(4) Operation for removing residual monomers:
  A PVC slurry after termination of polymerization reaction was quickly transferred to a slurry tank 1, and further to a heat exchanger 3 with a pump at a rate of 20 m³/h, where the slurry was heated. The heated slurry was introduced from a PVC slurry introducing port 22 provided in No. 5 chamber counted from the bottom of the apparatus for removing residual monomers, i.e., chamber 27. The slurry flew through passages partitioned with partition walls on Nos. 4, 3, 2, and 1 plates counted from the bottom., i.e., plates 34, 35, 36, and 37, during which the slurry was treated to release residual monomers with the steam mentioned before jetted through perforations in each plate. The PVC slurry which flows on the plates was heated to 100° C. by the steam, allowed to flow down via flow-down sections, and was discharged through a PVC slurry discharging port 12 to outside the residual monomer removing apparatus. Subsequently, the PVC slurry was transferred by a pump 5, cooled down to 50° C. in the heat exchanger, and was stored in a PVC slurry tank 6. The polyvinyl chloride monomer which was removed from the PVC slurry when the slurry contacted with steam on the plates was separated into vinyl chloride monomer and condensed water in a condenser 7, and then forwarded to a step for liquefying vinyl chloride monomers to recover the monomer.

The results are shown in Table 1. The concentration of residual vinyl chloride monomer in the PVC discharged from the apparatus for removing residual monomers was 250 ppb, the yellowing factor of the molded PVC product was 2.21, and the number of colored PVC particles was 0. The apparatus was smoothly operated. Bubbles on plates A and B stayed at a low level. Especially on plate B, almost no bubbling was observed, and fluid state of the slurry was remarkably excellent.

Example 2

The procedure of Example 1 was repeated except that the following changes were effected on the conditions (2) and (4) above.
(2) Used PVC slurry
  PVC: A homopolymer having an average polymerization degree of 700.
  Slurry concentration: 30% by weight
  Concentration of residual vinyl chloride monomers: 25,000 ppm
  Porosity of PVC: 0.231 ml/g
(4) Operation for removing residual monomers:
  A PVC slurry was introduced into the apparatus for removing residual monomers from a PVC slurry introducing port 19 provided in No. 8 chamber counted from the bottom of the apparatus.

The results are shown in Table 1. The concentration of residual vinyl chloride monomer in the PVC discharged from the apparatus for removing residual monomers was 350 ppb, the yellowing factor of the molded PVC product was 8.62, and the number of colored PVC particles was 0. The apparatus was smoothly operated. Bubbles on plates A and B stayed at a low level. Especially on plate B, almost no bubbling was observed, and fluid state of the slurry was remarkably excellent.

Example 3

The procedure of Example 1 was repeated except that the following changes were effected on the conditions (2) and (4) above.
(2) Used PVC slurry
  PVC: A homopolymer having an average polymerization degree of 1,300.
  Slurry concentration: 30% by weight
  Concentration of residual vinyl chloride monomers: 30,000 ppm
  Porosity of PVC: 0.409 ml/g
(4) Operation for removing residual monomers
  A PVC slurry was introduced into the apparatus for removing residual monomers from a PVC slurry introducing port 21 provided in No. 6 chamber counted from the bottom of the apparatus.

The results are shown in Table 1. The concentration of residual vinyl chloride monomer in the PVC discharged from the apparatus for removing residual monomers was 200 ppb, the yellowing factor of the molded PVC products was 2.72, and the number of colored PVC particles was 0. The apparatus was smoothly operated. Bubbles on plates A and B stayed at a low level. Especially on plate B, almost no bubbling was observed, and fluidity of the slurry was remarkably excellent.

Comparative Example 1

In Comparative Example 1, an apparatus was used which was provided with plates all of which have the same size, in contrast to the apparatus for removing residual monomers shown in FIGS. 1 to 3, and only one slurry introducing port, and has the following specifications:
A) Number of plates: 7
B) Space between adjacent two plates: 1,400 mm C) Specification of plate structure:
  a) Specification of all plate structures:
    Diameter of plate: 1,300 mm
    Diameter of each perforation: 1.3 mm
    Opening ratio (%): 0.3% (total area of perforations/ area of plate)
    Height of partition walls: 500 mm
    Height of division walls: 450 mm
    Width of the passages for treatment: 200 mm
D) PVC slurry introducing port:
  Location: Chamber No. 8 counted from the bottom.
  Number: One.
E) PVC slurry discharging port:
  Location: Chamber No. 2 counted from the bottom.
  Number: One.
F) Hot water jetting device:
  Location: At the position 15 cm below the lower surface of each of plate Nos. 2, 3, 4, 5, 6, and 7 counted from the bottom.
  Number: One at each location, a total of 6 devices.
  Diameter: 800 mm
  Jet nozzle: Circular nozzles each having a diameter of 4 mm. Some nozzles were inclined 45° from a vertical direction, and the other ones were inclined 30° from a vertical direction.
    Each of them was arranged to wash the inside walls of the chamber and the lower surface of the immadiate upper plate.
  Shape: A ring shape, made of a pipe having a diameter of 50A.
  Manner of jetting: Hot water was jetted in an amount of 0.5 m³/h for 5 seconds at intervals of 10 minutes.
(2) Used PVC slurry
  The same slurry as in Example 1 was used.
(3) Steam introduced from the steam introducing port disposed at the bottom chamber of the tower
  Temperature: 110° C.
  Flow rate: 600 kg/h
(4) Operation for removing residual monomers The procedure for removing residual monomers described in Example 1 was repeated except that a PVC slurry was introduced into the apparatus for removing residual monomers from a PVC slurry introducing port provided in No. 8 chamber counted from the bottom of the apparatus.

The results are shown in Table 1. The concentration of residual vinyl chloride monomer in the PVC discharged from the removal apparatus was 100 ppb and the yellowing factor of the molded PVC product was 7.52. Since the contact time of the slurry with steam was excessively long compared to that in Example 1 in which the same PVC slurry was treated, heat degradation of molded PVC product was large, and therefore, commercial values was decreased. Bubbles on plate A marked a high level. On plate B, bubbling was also observed. The number of colored PVC particles was 5. This number indicates that although the hot water jetting device was operated, PVC particles which were lifted up by the bubbles and adhered to the inner walls of the apparatus could not sufficiently be removed by the water jet. Occurrence of the colored PVC is considered to be attributed to the bubbling.

Comparative Example 2

The procedure of Comparative Example 1 was repeated except that the PVC slurry was replaced by that employed in Example 2.

The results are shown in Table 1. Bubbles on plate A marked a slightly high level. On plate B, bubbling was also observed. The number of colored PVC particles was 4. Occurrence of the colored PVC is considered to be attributed to the bubbling as in Comparative Example 1.

Comparative Example 3

The procedure of Comparative Example 1 was repeated except that the PVC slurry was replaced by that employed in Example 3.

The results are shown in Table 1. Vigorous bubbling was observed on plate A. The PVC slurry overflew beyond the partition walls. Operation of the apparatus became unstable. Since some PVC slurry which did not properly contact with steam was included, the concentration of residual polyvinyl chloride monomer contained in the PVC discharged from the apparatus showed a value as high as 80,000 ppd. Twenty five particles of colored PVC were found to be included. It is considered that the PVC particles which were lifted up by the bubbles and adhered to the inner walls of the apparatus could not sufficiently be removed by the water jet. On plate B, fluid state of the slurry flow remained unstable though the height of bubbles slightly decreased.

Comparative Example 4

In Comparative Example 4, an apparatus was used which had a smaller number of plates than the structure of the apparatus for removing residual monomers shown in FIGS. 1 to 3, with the diameter of the uppermost plate being greater than that of others, had only one slurry introducing port in the uppermost chamber, and had the following specifications:

A) Number of plates: 5
B) Space between adjacent two plates: 1,400 mm
C) Specification of plate structures:
  a) Plate structures No. 1, 2, 3, and 4 counted from the bottom:
    Inner diameter: 1,300 mm
    Diameter of each perforation: 1.3 mm
    Opening ratio (%): 0.3% (total area of perforations/ area of plate)
    Height of partition walls: 500 mm
    Height of division walls: 450 mm
    Width of the passage for treatment: 200 mm
  b) Plate structure No. 5 counted from the bottom:
    Diameter of the plate: 2,000 mm
    Diameter of each perforation: 1.3 mm
    Opening ratio (%): 0.3% (total area of perforations/ area of plate)
    Height of partition walls: 290 mm
    Height of division walls: 250 mm
    Width of the passage for treatment: 200 mm
D) PVC slurry introducing port:
  Location: Chamber No. 6 counted from the bottom.
  Number: One.
E) PVC slurry discharging port:
  Location: Chamber No. 2 counted from the bottom.
  Number: One.
F) Hot water jetting device:
  Location: At the position 15 cm below the lower surface of each of plate Nos. 2, 3, 4, and 5 counted from the bottom.
  Number: One at each location, a total of 4 devices.
  Diameter: 800 mm
  Jet nozzle: Circular nozzles each having a diameter of 4 mm. Some nozzles were inclined 45° from a vertical direction, and the other ones were inclined 30° from a vertical direction.

Each of them was arranged to wash the inside walls of the chamber and the lower surface of the immadiate upper plate.

Shape: A ring shape, made of a pipe having a diameter of 50A.

Manner of jetting: Hot water was jetted in an amount of 0.5 m³/h for 5 seconds at intervals of 10 minutes.

(2) Used PVC slurry

The same slurry as in Example 2 was used.

(3) Steam introduced from the steam introducing port section of the apparatus for removing residual monomers Temperature: 110° C.

Flow rate: 600 kg/h

The results are shown in Table 1. The concentration of residual vinyl chloride monomer in the PVC discharged from the removal apparatus was 80,000 ppd and the yellowing factor of the molded PVC product was 2.98. Since the contact time of slurry with steam was in sufficient, in other words, the treating capacity of the apparatus was insufficient compared to Example 2 in which the same PVC slurry was treated, the concentration of residual monomers in the discharged PVC showed a high value. The PVC polymer having a polymerization degree of 700 is very difficult to release residual monomers. Therefore, only small amounts of residual monomers can be removed on a plate having a great diameter which provides mild conditions for the treatment and contributes to mitigate bubbling. Accordingly, the PVC slurry is transferred to lower stages while retaining a high concentration of residual monomers. As a result, bubbling was observed in lower stages. Presumably for this reason, 6 particles of colored PVC were included.

According to the apparatus for removing residual monomers of the present invention, the following effects can be obtained:

(1) Since, according to the present invention, conditions for removing residual monomers can be flexibly and suitably selected to comply with PVCs which are diversified in characteristics and properties, it became possible to control the bubbling property of the slurry, readiness of releasing residual monomers, heat degradation degree of PVC, and operation efficiency of the apparatus for removing residual monomers to a best condition as a whole.

(2) Since treatment conditions can be selected in accordance with the characteristics of the individual PVC after polymerization, inherent properties of PVC are not deteriorated compared to the case where a PVC slurry is treated with a conventional method for removing residual monomers.

(3) Colored PVC can be significantly reduced.

(4) Since pulsing and bubbling of a PVC slurry are mitigated and tranquilized on a plate having a great diameter, unstable slurry flow comes not to be transmitted to the plates in a lower section. As a result, a stable operation control at an extremely high level as a whole apparatus for removing residual monomers becomes possible.

(5) Such many factors as overflow of a PVC slurry beyond partition walls, blocking of a condenser, and inclusion of colored particles, which are caused by bubbling of the slurry; as well as transmission of pulsing due to unbalance of pressure and temperature in the apparatus for removing residual monomers, all of which adversely affect to the quality of PVC and maintenance of apparatus are eliminated or reduced. Therefore, supply of PVC with more a stable quality more stably becomes possible. Moreover, the steps required for the maintenance of the apparatus and loss of time accompanied therewith are improved to enhance the productivity.

TABLE 1

|  | Examples | | | Comparative Examples | | | |
| --- | --- | --- | --- | --- | --- | --- | --- |
|  | 1 | 2 | 3 | 1 | 2 | 3 | 4 |
| Slurryl used* | [a] | [b] | [c] | [a] | [b] | [c] | [d] |
| Porosity of PVC (ml/g) | 0.322 | 0.231 | 0.409 | 0.322 | 0.231 | 0.409 | 0.231 |
| Bubbling status |  |  |  |  |  |  |  |
| Plate A | B | B | B | B | B | D | B |
| Plate B | A | A | A | B | B | C | B |
| Operating condition | very stable | very stable | very stable | stable | stable | unstable | stable |
| VC concentration in PVC in the discharging section (ppb) | 250 | 350 | 200 | 100 | 350 | 80,000 | 80,000 |
| Yellowing factor (ΔYI) | 2.21 | 8.62 | 2.72 | 7.52 | 8.82 | 9.64 | 2.98 |
| Colored PVC (/PVC 100 g) | 0 | 0 | 0 | 5 | 4 | 25 | 6 |

*Slurry used:
[a] = PVC: A homopolymer with a polymerization degree of 1,300; Slurry concentration: 30 wt %; Concentration of residual monomers: 30,000 ppm; Porosity of PVC: 0.322 ml/g.
[a] = PVC: A homopolymer with a polymerization degree of 700; Slurry concentration: 30 wt %; Concentration of residual monomers: 25,000 ppm; Porosity of PVC: 0.231 ml/g.
[a] = PVC: A homopolymer with a polymerization degree of 1,300; Slurry concentration: 30 wt %; Concentration of residual monomers: 30,000 ppm; Porosity of PVC: 0.409 ml/g.

What is claimed is:

1. A method for removing residual monomers from a polyvinyl chloride containing slurry comprising: using an apparatus consisting essentially of (i) a hollow cylindrical tower, the tower being generally vertically oriented and having a top region and a bottom region; (ii) a plurality of plates vertically spaced within the tower, each plate defining a plurality of perforations; (iii) a plurality of chambers, each chamber defined between adjacent plates and each respective plate constituting the floor of a respective chamber; (iv) a plurality of slurry introducing ports defined in at least two of the chambers; (v) plurality of flow-down sections, each flow-down section defined between two adjacent plates for allowing the slurry to sequentially flow downward from a first plate of the two adjacent plates, to a second plate disposed below a first plate; (vi) a steam introducing port defined within said bottom region of the tower, and (vii) a slurry discharging port defined in a chamber below a lowermost chamber defining at least one of the slurry introducing ports, wherein the plate in one of the chambers defining a slurry introducing port has a diameter of 1.05 to 5 times larger than the diameter of each of the plates disposed in chambers immediately above and below that chamber;

introducing a polyvinyl chloride containing slurry into said tower from one of said slurry introducing ports;

delivering steam to said tower from said steam introducing port;

allowing said slurry to contact said steam while said slurry flows downward through said plates, thereby separating residual monomers from said slurry and producing a first stream comprising separated residual monomers and a second stream from which said separated residual monomers have been removed;

discharging said first stream comprising said separated residual monomers from said top region of said tower; and     discharging said second stream from which said residual monomers have been removed from said slurry discharging port;

wherein the step of introducing said polyvinyl chloride containing slurry is performed in accordance with either (1) or (2), depending upon the porosity of polyvinyl chloride in said slurry:

(1) introducing said polyvinyl chloride containing slurry from said slurry introducing port of said chamber having a plate with a diameter of 1.05 to 5 times larger than the diameter of each of the plates disposed in chambers immediately above and below that chamber when the porosity of the polyvinyl chloride in said slurry is not less than 0.300 ml/g; and         (2) introducing said polyvinyl chloride containing slurry from said slurry introducing port of a chamber disposed above said chamber having a plate with a diameter of 1.05 to 5 times larger than the diameter of each of the plates disposed in chambers immediately above and below that chamber when the porosity of the polyvinyl chloride in said slurry is less than 0.300 ml/g.

2. The method of claim 1 wherein the plate in one of the chambers defining a slurry introducing port has a diameter of 1.2 to 5 times larger than the diameter of each of the plates disposed in chambers immediately above and below that chamber.

3. The method of claim 1 wherein said first stream discharged from said tower is in the form of a gas.

4. The method of claim 3 further comprising:

condensing said first stream from said gas form to a liquid.

5. The method of claim 1 wherein (1) is performed when the porosity of the polyvinyl chloride in said slurry is not less than 0.350 ml/g.

* * * * *